United States Patent [19]
Campbell

[11] 3,922,679
[45] Nov. 25, 1975

[54] WIDE BAND RADIO-FREQUENCY PHASE SENSOR

[75] Inventor: Donn V. Campbell, Eatontown, N.J.

[73] Assignee: The United States of America as represented by the Secretary of the Army, Washington, D.C.

[22] Filed: Aug. 6, 1974

[21] Appl. No.: 495,451

[52] U.S. Cl. ............ 343/703; 343/745; 343/856
[51] Int. Cl.² ............................................. G01R 25/04
[58] Field of Search .......... 343/703, 745, 746, 747, 343/748, 845, 850, 856, 894

[56] References Cited
UNITED STATES PATENTS

| | | | |
|---|---|---|---|
| 2,810,070 | 10/1957 | Yates | 343/745 |
| 2,874,274 | 2/1959 | Adams et al. | 343/745 |
| 3,381,222 | 4/1968 | Gray | 343/703 X |
| 3,475,703 | 10/1969 | Kennedy et al. | 343/703 X |

*Primary Examiner*—James W. Lawrence
*Assistant Examiner*—E. R. LaRoche
*Attorney, Agent, or Firm*—Nathan Edelberg; Robert P. Gibson; Arthur Boatright

[57] ABSTRACT

A phase sensing device, indicating RF transmitter antenna resonance with a high degree of accuracy, for use with tuneable antennae operating in a frequency range of 2 – 30 MHz. The device operates by sampling a time varying (RF) voltage and current appearing at the antenna feed point. A sample of the voltage between the antenna terminal and ground is vectorially combined in two ways with the voltages proportional to the antenna input current. In the first combination, the voltage is derived from the current and leads the current by 90°, while in the second combination, it lags the current by 90°. The resultant RF voltages are rectified independently, and the two independent DC voltages obtained are combined or added with opposite polarity. The difference of the two DC voltages is then the output signal of the sensor and since proportional to the phase difference of voltage and current in the antenna is indicative of the resonant condition of a tuneable antenna. The sensing error signal of the present device may then be connected to amplifiers and a servo motor coupled to a tuning reactor attached to the antenna. The device includes a transformer, center tapped to ground substantially eliminating stray capacitive effects, while the overall circuit requires no balancing adjustment because of its inherent symmetry.

3 Claims, 3 Drawing Figures

3,922,679

WIDE BAND RADIO-FREQUENCY PHASE SENSOR

The invention described herein may be manufactured and used by or for the Government for governmental purposes without the payment of any royalties thereon or therefor.

BACKGROUND OF THE INVENTION

This invention relates generally to a phase sensor for controlling an automatic antenna tuner to maintain an antenna in a resonant condition and more specifically to an improved phase sensor which allows for tuneable antenna operation in a high frequency range from 2 – 30 MHz range and is especially adapted to certain antennae having a high Q or high peak resonance demand.

The use of phase sensors for indicating and controlling an automatic antenna tuner is well known. The prior art shows a variety of circuit configurations utilized for phase sensors. In certain antennae requiring a high peak resonance, it is necessary to continuously adjust the tuning in order to compensate for disturbances which may occur from motion of the antenna, change in the electro-magnetic environment around the antenna or an intentional frequency change. A problem in the phase sensor shown in the prior art is that the utilization has only been effective for particular frequencies and has not permitted a broad range of antenna frequency operation to allow for tuning adjustment. The phase sensors found in the prior art have been adapted for specific frequency ranges and have required additional monitoring and compensation to adjust the phase sensor itself over a large frequency range of operation of the antenna.

The present device improves the operating range in which the antenna may be sharply tuned by providing a circuit configuration with a high degree of symmetry with respect to ground, thus substantially eliminating small physical and electrical unsymmetries which give rise to substantial indicating errors. Also, the present device utilizes a center tap transformer which is grounded, eliminating stray capacitive effects at higher frequencies. The circuit in the present invention provides a significant reduction in components and because of its inherent symmetry requires no balancing adjustment.

BRIEF DESCRIPTION OF THE INVENTION

A wide bandwidth radio frequency phase sensor connected to a tuneable antenna for providing an indicating signal indicative of the resonance condition of the antenna comprising an antenna connector, a broad band transformer connected to said antenna connector, said antenna connector acting as a primary for said broad band transformer, said broad band transformer having a pair of secondary windings symmetrically disposed, said secondary windings having a center tap ground and connected to a pair of matched diodes, said antenna connector coupled directly to ground through two series capacitors forming a voltage divider. The secondary windings with the matched diodes are connected through a choke to an output means and to the capacitive voltage divider. In operation, the transformer is comprised of a toroid with twisted secondary windings being symmetrically wound about the toroid, the antenna connector being disposed through the toroid, acting as the primary winding. The secondary windings are twisted in pairs to provide maximum symmetry about the toroid.

The RF signal received by the antenna is also tapped directly from the antenna connector and fed to ground through two series capacitors which form a voltage divider. Simultaneously, the incoming RF signal is sampled through the broad band transformer with the primary winding being the center conductor from the antenna passing through the toroid. The secondary windings are center tapped on the toroid, the signal coming off the transformer from two secondary windings through the center tap. If the antenna is matched (resonant frequency), the signals across the secondary will cancel each other. If the antenna is in a non-resonant condition, i.e. the voltage and current not in phase along the transmission line, then the signals across the secondary windings will not vectorially add to zero and when rectified through a pair of matched diodes will produce a resultant positive or negative DC signal. A resistive current limitor may be added to prevent loading of the transmission line. The series capacitors provide for compensation from the reactance of the transformer necessary for phase measurement. If the antennaa is not tuned properly, resulting in a non-resonant condition, the resultant indicating DC signal may be used to mechanically or electrically be connected to a tuner to provide the necessary reactance to bring the circuit into resonance. The DC signal could also be utilized with a meter for visual checking by an operator who could manually tune the antenna.

It is an object of this invention to provide a wide band ratio frequency phase sensor for use in tuning continuously for providing antenna resonance information.

It is another object of this invention to provide a device which samples an RF signal, determines if the load being fed from an antenna is in a resonant condition and which, if in a non-resonant condition, will produce a DC signal which is utilized to automatically or manually provide an indication to provide the necessary reactance to tune the antenna into resonance.

And yet still another object of this invention is to provide an improved phase sensing device having an extremely symmetrical broad band transformer secondary winding which reduces stray erroneous signals on the secondary output.

But still yet another object of this invention is to provide a phase sensing circuit utilizable with a tuneable antenna having a reduced number of components and improved error sensing through a balanced system.

And still yet another object of this invention is to provide a wide band radio frequency sensor operable in a frequency band range from 2 – 30 MHz frequency range having an improved broad band transformer utilizing a toroid core and an improved symmetrically wound secondary winding.

In accordance with these and other objects which will be apparent hereinafter, the instant invention will now be described with particular reference to the accompanying drawings.

PREFERRED EMBODIMENT OF THE INVENTION

Figure 1:
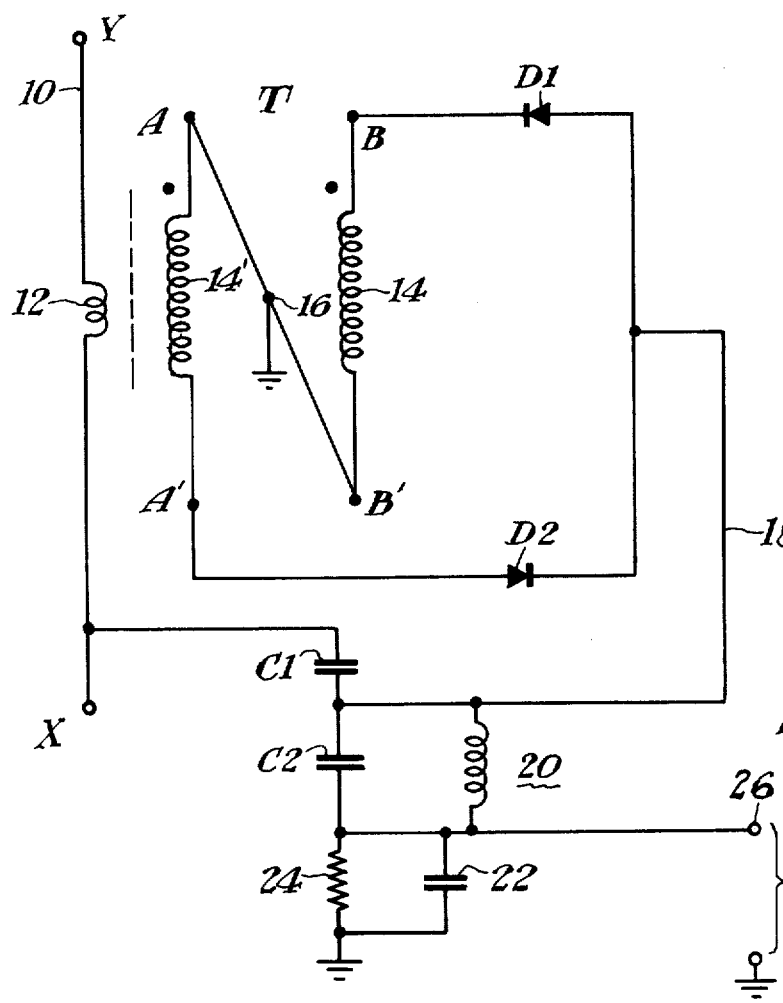
FIG. 1 shows a circuit diagram of the present invention.

Referring now to the drawings and specifically FIG. 1, the improved circuit for phase sensing in the present invention is shown comprised of an antenna conductor 10 connected at the Y end to an antenna with the X end connected to the transmission line and a RF transmitter. The conductor 10 is connected through a toroid acting as a broad band transformer with the primary 12 connected through the toroid acting as a primary for the transformer. The transformer toroid construction is shown below. The transformer has a pair of secondary windings 14 and 14' which are center-tapped to ground at 16 in a symmetrical manner with secondary winding 14' connected to diode D2 while winding 14 is connected to a matched diode D1. The matched diodes D1 and D2 are DC coupled by conductor 18 through a choke 20 to the signal output connector 26. The antenna lead-in conductor 10 is also connected to a pair of capacitors C1 and C2 which act as a voltage divider in series with conductor 10, the capacitors being coupled to ground through resistance 24. Capacitor 22 is coupled to ground which acts to by-pass any RF to keep it from interfering with the DC signal. The signals from the secondary windings 14 and 14' are rectified by diodes D1 and D2 with the windings being symmetrically balanced and matched such that with the antenna in resonance, no resultant DC signal will be present on conductor 18. Capacitors C1 and C2 provide capacitive reactance on the primary winding to compensate for inductive reactance induced by the loading.

In operation, the system provides for an error signal if the antenna is not properly matched or in resonance. First, if the antenna is in a resonant condition, the current or signals will cancel because of the symmetry of the secondary windings resulting in no DC signal, which is indicative that the antenna is properly tuned. Or if the antenna is in a non-resonant condition, such that the voltage and current are not in phase in the transmission line, the resultant signal will not vectorially add to zero and through the rectification of diodes D1 and D2, a resultant DC signal will be produced which will be picked up across contact 26.

The present device also contains additional elements such as resistor 24 which limits the sampling current so as not to load the transmission line. Capacitors C1 and C2 are selected to give an RF voltage amplitude approximately equal to that as coming from the transformer thus providing for a matching of the reactance of the transformer winding for compensation in the phase measurement. Capacitor 22 is selected to by-pass any RF signals to ground not filtered by choke 20 to keep it off the DC signal.

Thus, because of the symmetry produced in the circuitry as shown in FIG. 1, the device is capable of operating in frequency range that has been determined between 2 and 30 MHz efficiently while not requiring additional circuit elements nor tuning means.

Figure 2:
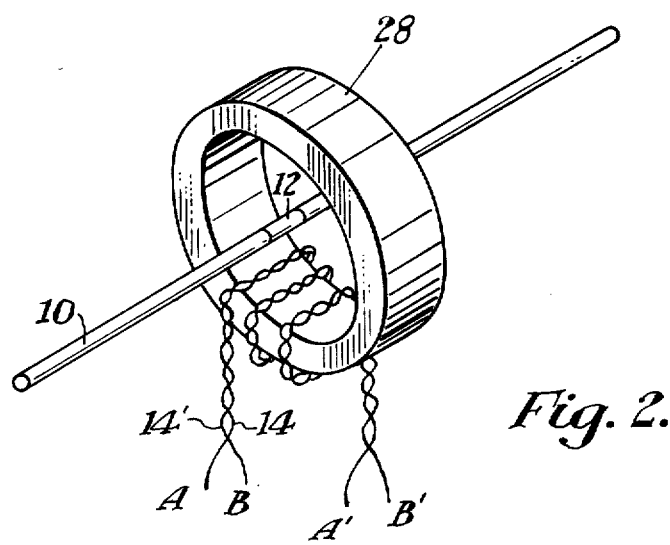
FIG. 2 shows a perspective view of a broad band transformer utilized in the present invention including the primary and secondary windings.

Referring now to FIG. 2, the construction of the broad band transformer is shown which results in a balanced or symmetrical winding pattern with the transformer being comprised of a small ferrite toroid 28 having the conductor 10 acting as a primary 12 disposed through the center. The secondary windings are comprised of two strands of insulated copper wire uniformly twisted together with the ends of the wires labeled as A, B, A', and B'. After the wires are twisted together, the pair of wires formed are closely wound on the ferrite core and are shown in a working model wound three times about the core. After the two wires are twisted and the pair of wires are wound on the core, then the two pairs of wires are additionally twisted together forming a bundle of four wires as shown in FIG. 3.

Figure 3:
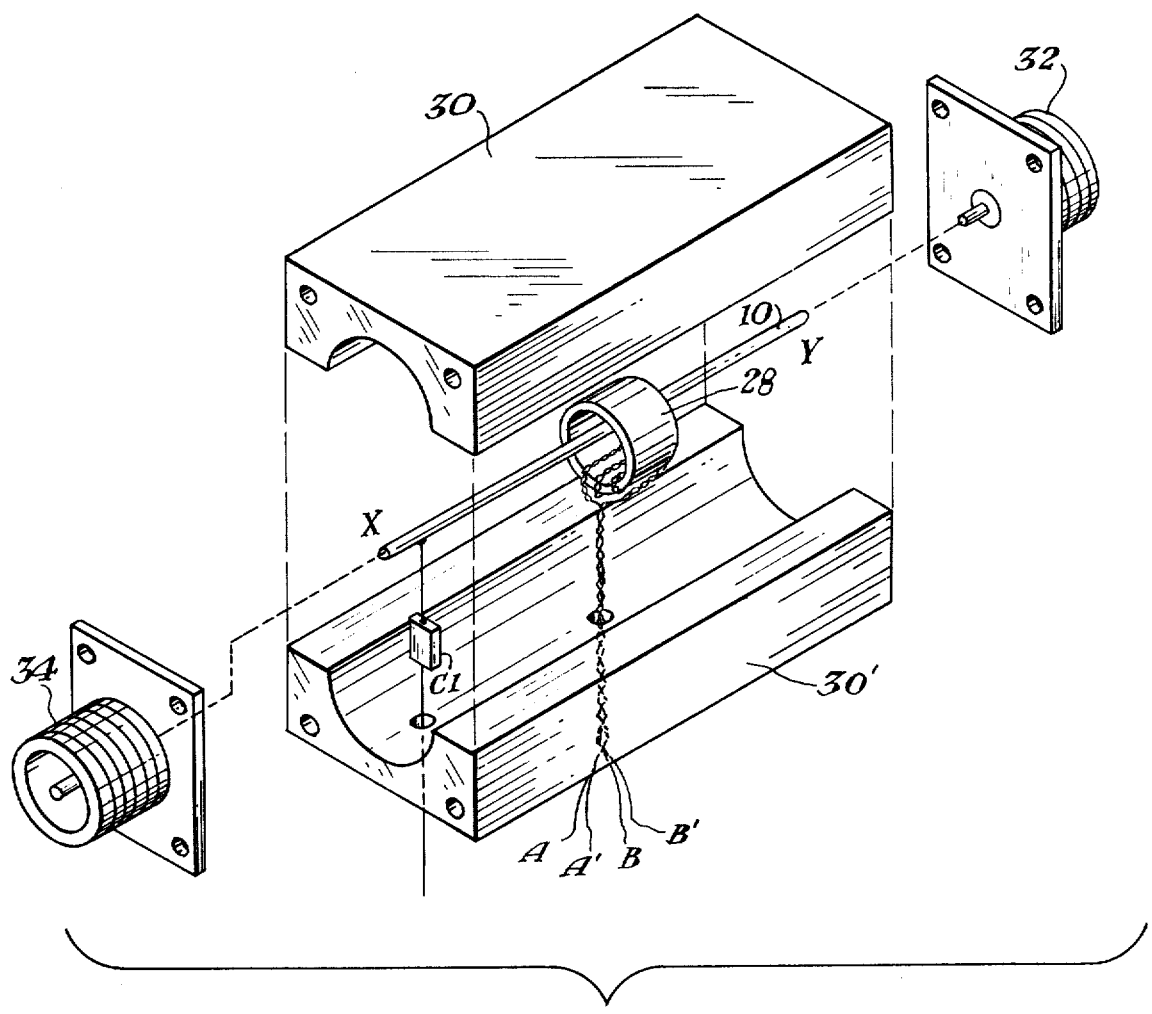
FIG. 3 shows an exploded view of a transformer assembly including a pick-up capacitor as utilized in the present invention.

FIG. 3 shows the transformer housing comprising a metal housing split into two sections 30 and 30' which houses the ferrite core 28, the antenna conductor lead 10 passing through the toroid and connected near the X end to capacitor C1 which may or may not be disposed within the chamber formed by the housing. The secondary windings comprising pairs of twisted windings are shown which may be disposed through the housing as shown. An antenna RF connector 32 is disposed at the Y end of conductor 10 while the RF transmitter connector 34 is disposed at the X end.

The twisting of the secondary winding on the toroidal core as employed in the broad band transformer is very important in that the winding being twisted together and again twisted in strands of four provide a symmetry in the secondary winding circuit which is essential to the accurate operation of the device, and which require no balancing adjustment in the device because of its inherent symmetry. The circuit configuration also reduces the number of component parts required. With the center-tap secondary being grounded, the stray capacitive effects are reduced at higher frequencies, thus resulting in more system efficiency. Thus, the overall circuitry and utilization of the toroid transformer secondary winding as disclosed by the present invention provide a device having a high degree of symmetry with respect to ground, eliminating substantial errors which would normally arise from unsymmetry thus allowing for a wider band of operation and a higher frequency range from 2 – 30 MHz.

In utilizing a phase sensor with an antenna having a high Q or sharp peak resonance, it is necessary to continuously tune the antenna to compensate for disturbances caused from motion of the antenna or the like. The present device described herein can be connected to an amplifier and a servo motor coupled to a tuning reactor attached to the antenna. When the antenna is in resonance the motor will be inactive. However, if the antenna were detuned from resonance due to a frequency shift or other disturbance, the motor would then adjust the tuning reactor to restore resonance. The motor would of course run in one direction or the other, depending on the polarity of the amplified DC error signal derived from Applicant's phase sensor. Thus, the present device will produce a corresponding DC output voltage of either positive or negative polarity with respect to ground which would thus be indicative of the antenna inductive or capacitive feed point impedance to allow the adjustment of the antenna from a non-resonant to a resonant state.

In viewing the importance of the windings on the broad band transformer, the fact that the two wires are first twisted together and then looped on the toroid forming a secondary winding is important because the two secondary windings will thus be adjusted for equal value and coupling. This does away with the necessity of having a balancing resistor necessitated by non-symmetry in the secondary windings.

The secondary center tap is formed by connecting secondary end wiring A to end B' and grounding them to the housing. The two remaining wire ends A' and B are connected to the diodes as shown in FIG. 1. The values of the circuit elements shown in the transformer were designed for a working model operating in the high frequency range from 2 to 30 MHz. However, the circuit and the transformer could be adapted for use at other frequencies.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device coupled to an RF antenna for providing a signal indicative of the resonance condition of the antenna comprising:

an RF transformer including a toroidal core having a primary winding, and first and second secondary windings coupled thereto;

each said first and second secondary windings including an insulated conductor, said conductors being twisted together symmetrically about each other from substantially one end to the other end of said secondary windings;

said one end of said first and said other end of said second secondary windings being connected in common and to ground;

matched rectifying means coupled to said other end of said first and said one end of said second secondary windings;

capacitive voltage dividing means connected between one end of said primary winding and ground;

the other end of said primary winding having means for feeding said antenna;

means connecting said matched rectifying means to said capacitive voltage dividing means; and DC signal output means coupled to said rectifying means and said capacitance voltage dividing means for receiving a DC signal indicative of the antenna resonance condition.

2. A device, as in claim 1, wherein: said rectifying means includes a pair of matched diodes, the cathode of one said diode connected to said one end of said second secondary winding and the anode of the other said diode connected to said other end of said first secondary winding.

3. A device, as in claim 2, including:

an RF choke connected between said matched diodes and said signal output means.

* * * * *